United States Patent

Davis et al.

[11] Patent Number: 6,093,767
[45] Date of Patent: Jul. 25, 2000

[54] HIGH SHOCK ABSORBING RUBBER COMPOSITIONS

[75] Inventors: Fred Davis, Kent; Zbig Z. Zivny, Painesville, both of Ohio

[73] Assignee: Purchasing Inc., Painesville, Ohio

[21] Appl. No.: 09/190,052

[22] Filed: Nov. 10, 1998

[51] Int. Cl.[7] .................... C08K 3/36; C08L 9/02; C08L 23/16; C08L 23/32; C08L 35/04
[52] U.S. Cl. .................... 524/492; 524/493; 524/442; 524/526
[58] Field of Search ....................... 524/492, 493, 524/495, 442, 526

[56] References Cited

U.S. PATENT DOCUMENTS

| | | |
|---|---|---|
| 4,224,196 | 9/1980 | Gursky . |
| 4,254,013 | 3/1981 | Friedman et al. . |
| 4,430,466 | 2/1984 | Cooper ..................... 524/83 |
| 4,451,595 | 5/1984 | Lee . |
| 4,569,834 | 2/1986 | West et al. ............... 423/460 |
| 4,792,583 | 12/1988 | Coran . |
| 4,886,850 | 12/1989 | Ogawa et al. . |
| 4,919,183 | 4/1990 | Dobson ..................... 152/502 |
| 5,036,132 | 7/1991 | Coran . |
| 5,089,554 | 2/1992 | Bomo et al. .............. 524/493 |
| 5,407,989 | 4/1995 | Davis et al. .............. 524/405 |
| 5,464,899 | 11/1995 | Freeman et al. ........ 524/504 |
| 5,532,309 | 7/1996 | Fukui et al. .............. 524/451 |
| 5,582,890 | 12/1996 | Davis et al. .............. 428/57 |
| 5,696,197 | 12/1997 | Smith et al. .............. 524/495 |
| 5,854,327 | 12/1998 | Davis et al. .............. 524/445 |
| 5,981,649 | 11/1999 | Hiraoka et al. .......... 524/525 |

*Primary Examiner*—Vasu Jagannathan
*Assistant Examiner*—Katarzyna Wyrozebski
*Attorney, Agent, or Firm*—Hudak & Shunk Co, LPA

[57] ABSTRACT

A high shock absorbing rubber composition comprises a cured blend of a conjugated diene rubber such as natural rubber or nitrile rubber with an EPDM rubber, and significant amounts of silica and optionally clay. The cured composition has low pendulum rebound properties of 20% or less, and is suitable for use as sport grips such as tennis rackets or golf grips, hand tools, lawn equipment, and the like.

10 Claims, No Drawings

HIGH SHOCK ABSORBING RUBBER COMPOSITIONS

FIELD OF THE INVENTION

The present invention relates to a high shock absorbing rubber composition comprising a cured blend of a rubber derived substantially from conjugated dienes such as natural rubber or nitrile rubber, or both, with an EPDM rubber, as well as significant amounts of silica and optionally clay.

BACKGROUND OF THE INVENTION

Heretofore, rubber compositions have been composed of compounds which produce a cured composition generally providing high rebound and resiliency, and good wear resistance. However, in numerous articles high shock absorbing qualities and low rebound are desired in order to reduce impact, reduce rapid rebound, as well as to reduce stress and strain on one's muscles, bones and joints, and the like.

SUMMARY OF THE INVENTION

The present invention generally relates to rubber compositions having high shock absorbing qualities and low rebound values of about 20% or less. The ingredients include a cured blend of a substantially conjugated diene rubber with an EPDM rubber, silica, and optionally clay, as well as various rubber compounding aids such as zinc oxide, stearic acid, antioxidants, curing compounds, as well as curing accelerators, and the like. Desirably, the rubber compositions of the present invention contain low or nil amounts of oil, is generally free of carbon black except when utilized in small amounts as a pigment, and except for nitrile rubber, generally does not contain functionalized rubbers.

DETAILED DESCRIPTION OF THE INVENTION

The EPDM rubber composition of the present invention can contain one or more conventional rubbers which are generally well known to the literature and art. Such rubbers include substantially conjugated diene rubbers which are generally defined as rubbers containing at least about 30 percent, at least about 50 or 60 percent, or at least about 70, 80 or 90 percent of repeat units therein derived from conjugated diene monomers. Substantially conjugated diene rubbers include nitrile rubber or various hydrocarbon rubbers, such as natural rubber, that is rubber derived from the latex of rubber trees grown in the tropics, as well as rubbers derived from one or more conjugated dienes having from 4 to 12 carbon atoms with specific examples including butadiene, isoprene, pentadiene, hexadiene, 2,3-dimethyl-1, 3-butadiene, octadiene, and the like. The rubbers of the present invention also include copolymers of the above-noted conjugated diene monomers with one or more vinyl substituted aromatic monomers containing from 8 to 12 carbon atoms such as styrene, alpha-methyl styrene, t-butyl styrene, and the like. Examples of suitable hydrocarbon rubbers include polybutadiene, polyisoprene, natural rubber, styrene-butadiene rubber, and the like, with natural rubber being preferred due in part to its good green strength. The amount of hydrocarbon rubber is generally from about 20 to about 55 or 80 parts by weight, desirably from about 25 to about 50 parts by weight, and preferably from about 30 to about 45 parts by weight, based upon 100 total parts of the rubber, i.e., the hydrocarbon rubber and the EPDM rubber.

When nitrile rubber is utilized in combination with the EPDM rubber, as when the rubber composition will be employed in an oily or greasy environment, the amount thereof is generally from about 20 to about 80 parts by weight but typically is utilized in higher amounts than the hydrocarbon rubber as from about 45 to about 80 parts by weight and preferably from about 55 to about 70 parts by weight per 100 parts by weight of total rubber. Generally, any type of nitrile rubber can be utilized such as those made from monomers of acrylonitrile and a conjugated diene containing from 4 to 10 carbon atoms such as butadiene, isoprene, pentadiene, hexadiene, etc., with butadiene being preferred. The amount by weight of repeat groups derived from acrylonitrile generally is from about 20 to about 45 parts by weight, desirably from about 25 to about 40 parts by weight, and preferably from about 30 to about 35 parts by weight per 100 parts by weight of the nitrile rubber. Nitrile rubber is available under the trade name Paracril from Uniroyal Chemical, HYCAR from BFGoodrich, Chemigum from Goodyear Tire and Rubber Co.

The EPDM rubber of the present invention includes ethylene-alpha-olefin-diene rubbers in the form of terpolymers, tetrapolymers, pentapolymers, and the like. EPDM is generally amorphous having a degree of crystallinity of less than about 30% as measured by x-ray diffraction. The EPDM rubber comprises ethylene, one or more alpha-olefins other than ethylene with propylene being preferred, and one or more diene monomers which desirably are non-conjugated. The EPDM generally has a random arrangement of at least ethylene and alpha-olefin units in the polymer. Suitable alpha-olefin units, other than ethylene, are derived from monomers of propylene, 1-butene, 1-pentene, 1-hexene, 2-methylene-1-propene, 3-methylene-1-pentene, and the like. Examples of non-conjugated dienes include straight chain or cyclic hydrocarbon diolefins having a total of from about 6 to about 15 carbon atoms such as dicyclopentadiene, tetrahydroindene, alkyl-substituted tetrahydroindenes, 5-methylene-2-norbornene, 5-vinyl-2-norbornene, 2-methyl-norbornadiene, 2,4-dimethyl-2,7-octadiene, 1,4-hexadiene, 5-ethylidene-2-norbornene, and 3-methyl cyclopentene. Preferred non-conjugated diene compounds include 5-methylene-2-norbornene, dicyclopentadiene, 1,4-hexadiene, 5-ethylidene-2-norbornene, and 4,7,8,9-tetrahydroindene.

The EPDM of the present invention contains generally from about 40 to about 75 percent, desirably of from about 45 to about 70 percent, and preferably of from about 50 to about 65 percent by weight of ethylene repeating units. The amount of alpha-olefin repeat units other than ethylene is generally from about 1 5 to about 59 percent, desirably of from about 30 to about 53 percent, and preferably of from about 37 to about 47 percent by weight of alpha olefin repeating units. The amount of non-conjugated diene repeat units in the EPDM is generally from about 1 to about 10 percent, desirably from about 2 to about 8 percent, and preferably from about 2.5 to about 7 percent by weight. Suitable EPDM's for the present invention include Doyalene 525 and 505 (approximately 55% Et-40% P-5% NCD) made by Uniroyal, Inc., and EPSON 55 made by DSM Corporation.

The amount of EPDM in the present invention is generally from about 20 to about 80 parts by weight, and when utilized with the hydrocarbon rubber is desirably from about 50 to about 75 percent by weight, and preferably from about 55 to about 70 parts by weight, based on 100 total parts by weight of the hydrocarbon rubber and the EPDM rubber (phr). When an EPDM-nitrile rubber blend is utilized, the amount of the EPDM can broadly range from about 20 to about 80 parts by weight, desirably from about 20 to about 55 parts by weight, and preferably from about 30 to about 45 parts by weight based upon 100 total parts by weight of the nitrile rubber and the EPDM rubber. Although blends of the hydrocarbon rubber, the nitrile rubber and the EPDM rubber can be utilized, they are not preferred.

It is an important aspect of the present invention that the rubber composition contains significant amounts of one or more types of silica, and optionally one or more types of clay. These compounds are blended along with conventional additives such as rubber curatives, for example, sulfur, as well as rubber accelerators, and formed into desirable end product and then subsequently cured. The rubber composition of the present invention desirably has a Mooney viscosity (ML1+4 at 100° C.) of about 60 to about 150, and preferably from about 80 to about 120. Naturally, the mixing or blending results in a random blend of the hydrocarbon rubber and/or nitrile rubber and the EPDM, with the silica, optional clay, as well as the additives randomly distributed therein.

The silica and optional clay are incorporated into the composition of the present invention to impart desired qualities such as low rebound and high shock absorbency. Silica will also impart abrasion resistance and reinforce the rubber. Generally, any type of silica can be utilized with precipitated silicas being preferred. Examples of such precipitated silicas include the various HI-SIL silicas manufactured by PPG Industries, Inc., with HI-SIL 233 and HI-SIL255 being preferred. The amount of silica, when utilized with the hydrocarbon EPDM rubber blend is generally of from about 5 to about 40 parts by weight, desirably of from about 7 to about 30 parts by weight, and preferably of from about 10 to about 20 parts by weight, based on 100 parts by weight of total rubber in the composition (phr). When a blend of nitrile rubber with EPDM rubber is utilized, the amount of silica is generally from about 30 to about 80, desirably from about 35 to about 70, and preferably from about 40 to about 60 parts by weight per 100 parts by weight of total rubber in the composition.

Various clays are utilized to improve the reinforcing properties as well as tensile strength of the rubber composition. However, clays are generally not utilized when the rubber composition will be used in an oil or grease environment since it tends to absorb the same. When utilized, generally, any common type can be used such as Kaolin, etc., which has been treated to make it a hard clay. A suitable treating agent is a mercapto containing silane coupling agent which tends to provide a means to bond the clay particles to the rubber thereby increasing tensile strength and modulus while reducing heat build up. The amount of clay in the rubber composition is generally from about 5 to about 25 parts by weight, desirably from about 6 to about 20 parts by weight, and preferably from about 8 to 16 parts by weight, based on 100 parts by weight of total rubber in the composition (phr).

The rubber composition of the present invention, containing the above components when cured, is an abrasion-resistant, reinforced rubber having very low rebound, as well as high energy or shock absorbing properties. The Shore A hardness of the cured composition, whether it contains a nitrile rubber or a hydrocarbon rubber, is generally from about 55 to about 80 with about 60 to about 75 being preferred. The pendulum rebound of the cured rubber composition is generally 25% or 20% or less, desirably 15% or 12% or less, and preferably 10% or 8% or less.

An important aspect of the low rebound rubber compositions of the present invention is that they are substantially free of oil. That is, the total amount of oil within the rubber blend is generally about 10 or less, desirably about 6 or less, and preferably about 4 or 3 or less parts by weight per 100 parts by weight of total rubber. By the term "oil", it is generally meant rubber processing oils such as aromatic oils (e.g. naphthenic oils), paraffinic oils, and the like. Oils are avoided since, among other reasons, they tend to bleed and come out of the composition as well as increase rebound.

Another compound which is avoided is the various types of carbon black, such as furnace carbon black, channel carbon black, etc. Carbon blacks are avoided since hardness and abrasion resistance can be achieved using silicas. Thus, the total amount of carbon black, even when utilized as a pigment, is generally about 15 or less, desirably about 10 or less, preferably about 8 or 5 or less, or nill parts by weight per 100 parts by weight of total rubber.

The composition of the present invention includes various types of rubber additives such as processing aids, pigments, antioxidants, waxes, very small amounts of oil, curing agents, accelerators, and the like. Such additives when utilized in typical amounts have been found to help impart the desired properties unique to the present invention.

Considering the processing aids, they generally include zinc oxide, stearic acid, zinc salts of a fatty acid ester, or aromatic hydrocarbon resins. The amount of the zinc oxide is generally from about 1 to about 8, and preferably from about 2 to about 6 parts by wt. phr. The amount of stearic acid is generally from about 0.5 to about 2.0 parts by wt. phr. The salt can be zinc salts of a saturated and unsaturated a fatty acid ester, e.g., WB212 available from Struktol Corp. and is useful for reducing viscosity, improving flow, and the like. The amount thereof is generally from about 0.5 to about 5 and preferably of from about 1 to about 3 parts by wt. phr. The aromatic hydrocarbon resins are known to the art and literature such as Picco 100 and Neville LX1200 and are also utilized in small amounts as from about 1 to about 7 or 8 parts per weight phr.

Compositions of the invention generally utilize one or more numerous commercially available pigments, dyes or tinting agents commonly known to the art such as titanium dioxide, calcium carbonate, iron oxide, etc. Various amounts of one or more of these pigments, etc. can be used to effect a desired color.

The antioxidants which are utilized can be hindered amines such as paraphenylene diamine, hydroquinoline such as AO 246 available from Akrochem or AO 35 manufactured by Sovereign Chemical. Various antiozonates can also be utilized sold as PPD which is available from Akrochem, or Flexone 3 C, manufactured by Uniroyal Chemical Company. The antioxidants and the antiozonates can be utilized in conventional amounts depending upon the anticipated end use area and the amount thereof are generally small, such as from about 1 to about 5 parts by weight phr.

Various waxes can be utilized such as petroleum wax which yield a non-slippery feeling, yet help in the processing of the composition, and generally act as a release agent on a mill. Thus, PEH 100, available from Harwick Company, or Carbowax 3350 from Union Carbide can be used in an generally an amount from about 1 to about 6 and preferably from about 1.5 to about 5 phr. Another suitable type of wax are paraffin waxes which generally contain from 12 to 18 or 20 carbon atoms and are saturated. A sample of such a wax is Sunolite 100, available from Witco Corporation and can be used in amounts from about 0.5 to about 3 parts per weight phr.

If oils are utilized, as noted above, they are used in very small amounts which are generally not typical for rubber formulations. Paraffin oils are preferred inasmuch as it is desirable to have non-polar plasticizers. Naphthenic oils are avoided since they tend to bleed. An example of a suitable paraffin oil is Sunpar 2280, available from Sun Refining in an amount generally from about 0 or 1 to about 5 and preferably of from about 2 to about 4 parts per weight phr.

Naturally, various accelerates are utilized to reduce cure time and conventional accelerators such as the various thiazoles, thiurams, sulfenamides, and dithiocarbamates can be utilized in typical amounts such as from about 0.5 to about 4 and desirably from about 1 to 3 parts by weight phr. Preferred accelerators include Santocure NS, a sulfenamide made by Monsanto, butyl zimate, a butyl zinc salt of a dithiocarbamate made by Monsanto.

Another additive which is desirably utilized in the present rubber composition are compounds which give "feel" to the end article such as a golf or bike grip, or the like. Vulcanized vegetable oils are one class of such compounds, with a particular compound being Factice, available from Akrochem. As with the other additives, the amounts can vary depending upon desired end use with a suitable amount being generally from about 0.5 to about 5 and preferably from about 1 to about 4 parts by weight phr.

Of course, the cure of the rubber system is sulfur or various sulfur compounds generally utilized in an amount of from about ½ to about 4 or 5 parts by weight phr.

The various ingredients of the present invention can be compounded in a manner as set forth herein below in the examples. Generally, a master batch is first made wherein various ingredients are added to a conventional mixer such as a Banbury, and mixed. Subsequently, various other additives can be added and mixed in generally any order for suitable amounts of time. Once a rubber formulation has been compounded, as in a Banbury, a two-roll mill, and the like, it can be formed into the desirable end product and cured. The end product can be formed by injection molding, compression molding, and the like, with extrusion being preferred.

The present invention can be used in applications wherever low rebound, or high-energy absorption or shock absorption is desired. Thus, the rubber compositions of the present invention can be formed into sports grips such as a grip for a golf club or a grip for a tennis racket where the shock, which results respectively from the club face or the racket striking a ball, is absorbed. The composition can be utilized on items such as grips for other sports equipment such as gun stocks, hand guns and archery bows; hand tools such as hammers; lawn equipment such as shovels and hoes; grips for motorcycles and bicycles; automotive steering wheels; stereo equipment; and the like. This list is not self-limiting, but only sets forth a few examples of the many uses for the rubber composition of the present invention. Desirably the hydrocarbon rubber-EPDM rubber blend is utilized in applications wherein an oil or grease environment does not exist, such as in the utilization of golf club grips, a tennis racquet, etc., whereas the nitrile rubber-EPDM blend is desirably utilized in environments such as various tools, machines, etc., wherein grease or oil environment does exist.

The low rebound and high shock absorbing qualities of the rubber composition reduces impact stress, strain, shock, etc., imparted to a person's body, hands, feet, bones, joints, muscles, and the like.

The invention will be better understood by reference to the following examples which serve to illustrate, but not to limit the scope of the present invention.

EXAMPLE 1

| | PTS-WT |
|---|---|
| NR (SMR-5) | 35.00 |
| EPDM 525 | 62.00 |
| Zinc Oxide | 3.00 |
| Stearic Acid | 1.50 |
| Blackmaster Batch (1620 or 1601, no oil type) | 5.00 |
| Hard Clay (Silane treated) | 12.00 |
| HiSil 233 | 15.00 |
| A.O. 35 (Sovereign Chemical) | 2.00 |
| WB 212 Processing Aid (Struktol Co.) | 2.00 |
| PEH 100 | 4.00 |
| Sunpar 2280 oil | 3.00 |
| Sulfur | 1.00 |
| Santocure NS | 1.50 |
| Butyl Zimate | .75 |
| Wax - Sunolite 100 | 1.00 |
| Factice (light colored) | 2.50–3.00 |
| PENDULUM REBOUND AT 20° C. | 14% |

Two-Stage mixing was performed with rubber silica, stearic acid, and zinc oxide, etc, being mixed in an internal lab mixer. The curatives, i.e. sulfur, santocure NS, butyl zimate, were added on a two-roll lab mill. The following mixing sequence was utilized.

| STEP NUMBER | TIME ADDED | INGREDIENT ADDED |
|---|---|---|
| Step 1 | 0 min | add rubbers |
| Step 2 | 2 min | add zinc oxide and stearic acid and waxes |
| Step 3 | 2 min | add half of silica, add processing aids and oil |
| Step 4 | 4 min | add remainder of silica, factice and black master batch |
| Step 5 | 6 min | dump and measure dump temperature |
| Step 6 | 11.5 min | start next mix |

After being dumped, the mix was passed three times through a mill (without heat or cooling) to sheet out stock. After cooling, the sheet stock was stored for 24 hours.

The second stage took place on a two-roll lab mill heated to 50° C.–60° C., and mixing following sequence was initiated.

| STEP NUMBER | TIME ADDED | INGREDIENT ADDED |
|---|---|---|
| Step 1 | 0 min | add compound and band |
| Step 2 | 2 min | add additives and curatives |
| Step 3 | 6 min | cut and fold making four successive ¾ cuts from alternate ends of mill |
| Step 4 | 8 min | pass rolled stock endwise through the mill, roling up after each pass, repeat four successive times |
| Step 5 | 14 min | sheet off as soon as mix is smooth |

After stock was sheeted, it was left to cool for two hours, and then stored for one day. Samples were then cured from the sheeted stock in a laboratory press with cure conditions of 315° F. for 8 minutes.

EXAMPLE 2

| | PTS-WT |
|---|---|
| NBR (PARACRIL BJ) | 60.00 |
| EPDM 525 | 40.00 |
| HI SIL 233 | 50.00 |
| BLACKMASTERBATCH (1620 or 1601 NO OIL TYPE) | 6.00 |
| SILANE 184 | 1.00 |
| AROMATIC RESIN (PICCO 100) | 4.00 |
| ZINC OXIDE | 5.00 |
| STEARIC ACID | 1.00 |
| A. O. 35 (SOVEREIGN CHEMICAL) | 2.00 |
| CARBOWAX 3350 | 2.00 |
| SULFUR | 2.00 |
| SANTOCURE NS | 1.00 |
| BUTYL ZIMATE | .75 |
| WAX SUNOLITE 100 | 1.00 |
| FACTICE | 2.00 |
| PENDULUM REBOUND AT 20° C. | 17% |

The ingredients of Example 2 were processed in the same manner as the procedure set forth after Example 1 except, of course, nitrile rubber was utilized instead of natural rubber.

EXAMPLE 3

| | PTS-WT |
|---|---|
| XNBR | 70.00 |
| EPDM 525 | 30.00 |
| SILANE 189 | 1.00 |
| HI SIL 255 | 50.00 |
| AROMATIC RESIN (PICCO 100) | 4.00 |
| ZINC OXIDE 168 | 5.00 |
| STEARIC ACID | 1.00 |
| BLACK MASTERBATCH (1620 or 1601, NO OIL TYPE) | 6.00 |
| A.O. 35 (SOVEREIGN CHEMICAL) | 2.00 |
| CARBOWAX 3350 | 2.00 |
| SULFUR | 2.00 |
| SANTOCURE NS | 2.00 |
| BUTYL ZIMATE | .75 |
| WAX SUNOLITE 100 | 1.00 |
| FACTICE | 2.00 |
| PENDULUM REBOUND AT 20° C. | 11% |

The ingredients of Example 3 were processed according to the procedure set forth after Example 1.

As apparent from the examples, although different rubber formulations were utilized, very low rebound, that is values of 17%, 11% and 14% were achieved thus indicating the high shock absorbing properties of the rubber blends of the present invention.

While in accordance with the patent statues the best mode preferred embodiment have been set forth, the scope of the invention is not limited thereto, but rather by the attached claims.

What is claimed is:

1. A high shock absorbing rubber composition, comprising;
a cured rubber blend consisting essentially of from about 20 to about 80 parts by weight of a nitrile rubber and from about 80 to about 20 parts by weight of an EPDM rubber, based upon 100 total parts by weight of said nitrile rubber and said EPDM rubber;
an effective amount by weight of a silica to impart low rebound to said rubber composition; and
wherein said rubber composition is substantially free of a rubber processing oil, and
wherein said rubber composition has a pendulum rebound of about 25 percent or less.

2. A high shock absorbing rubber composition according to claim 1, wherein the amount of said silica is from about 5 to about 40 parts by weight per 100 parts by weight of said rubber.

3. A high shock absorbing rubber composition according to claim 2, wherein the amount of said silica is from about 10 to about 20 parts by weight phr; and wherein said rubber composition has a pendulum rebound of about 15 percent or less.

4. A high shock absorbing rubber composition according to claim 3, wherein said composition contains less than 6 parts by weight phr of oil, wherein said composition contains less than 10 parts by weight phr of carbon black, wherein said silica is precipitated silica, and wherein said rubber composition has a Shore A hardness of from about 55 to about 80.

5. A high shock absorbing rubber composition according to claim 1, wherein the amount of said nitrile rubber is from about 45 to about 80 parts by weight and wherein the amount of said EPDM rubber is from about 20 to about 55 parts by weight based upon the total amount by weight of said nitrile rubber and said EPDM rubber, and wherein the amount of silica is from about 30 parts to about 80 parts by weight phr.

6. A high shock absorbing rubber composition according to claim 5, wherein said nitrile rubber has an acrylonitrile content of from about 20 to about 45 parts by weight per 100 parts by weight of said nitrile rubber, and wherein said rubber composition has a pendulum rebound of about 20% or less.

7. A high shock absorbing rubber composition according to claim 6, where said EPDM rubber is derived from an ethylene monomer, a propylene monomer, and a non-conjugated diene monomer.

8. A high shock absorbing rubber composition according to claim 7, wherein the amount of nitrile rubber is from about 55 to about 70 parts by weight and wherein the amount of said EPDM is from about 30 to about 45 parts by weight, and wherein the amount of said silica is from about 35 to about 70 parts by weight per 100 parts by weight of said rubber, and wherein said rubber composition has a pendulum rebound of about 15% or less.

9. A high shock absorbing rubber composition according to claim 8, wherein the amount of said silica is from about 40 to about 60 parts by weight per 100 parts by weight of said rubber.

10. A high shock absorbing rubber composition according to claim 8, wherein said composition contains less than 6 parts by weight phr of oil, wherein said composition contains less than 10 parts by weight phr of carbon black, and wherein said silica is precipitated silica.

* * * * *